United States Patent [19]

Nettleton et al.

[11] Patent Number: 4,759,028
[45] Date of Patent: Jul. 19, 1988

[54] DOUBLE HELIX RF LINE FOR $CO_2$ LASER

[75] Inventors: John E. Nettleton; Dallas N. Barr; Clifton S. Fox, all of Prince William County, Va.

[73] Assignee: The United States of America as represented by the Secretary of the Army, Washington, D.C.

[21] Appl. No.: 146,548

[22] Filed: Jan. 21, 1988

Related U.S. Application Data

[63] Continuation-in-part of Ser. No. 875,841, Jun. 18, 1986.

[51] Int. Cl.[4] ............................................. H01S 3/097
[52] U.S. Cl. ......................................... 372/82; 372/87; 372/4; 372/61; 313/15
[58] Field of Search ............... 372/82, 87, 89, 4, 61, 372/64, 4, 69; 313/15

[56] References Cited

U.S. PATENT DOCUMENTS

| | | | |
|---|---|---|---|
| 3,427,567 | 2/1969 | Bridges et al. | 372/82 |
| 3,725,735 | 4/1973 | Beaulieu et al. | 378/87 |
| 4,370,598 | 1/1983 | Krahn | 372/87 |
| 4,589,114 | 5/1986 | Sutter, Jr. | 372/87 |

Primary Examiner—Leon Scott, Jr
Attorney, Agent, or Firm—Max L. Harwell; John E. Holford; Anthony T. Lane

[57] ABSTRACT

A novel design for an RF pumped gas laser is provided by spiralling an RF twin lead transmission line around a ceramic gas container. The pitch of the spiral and spacing between the leads of the transmission line are chosen to produce currents parallel to the axis of the spiral to provide more efficient energy transfer modes between the pump and the lasing gas.

8 Claims, 2 Drawing Sheets

DOUBLE HELIX RF LINE FOR CO2 LASER

This invention described herein may be manufactured, used, and licensed by the U.S. Government for governmental purposes without the payment of any royalties thereon.

This invention is a continuation-in-part of my earlier invention, disclosed in U.S. patent application Ser. No. 875,841, filed June 18, 1986.

BACKGROUND OF THE INVENTION

1. Field

The invention involves a polyatomic gas laser pumped by means of a radio frequency (RF) generator of electromagnetic radiation (EMR). Of particular interest is a $CO_2$-$N_2$-He laser which produces radiation in the far infrared band from 9-12 microns.

2. Prior Art

A typical prior art structure is shown in U.S. Pat. No. 3,537,030, "GAS LASER DEVICE WITH MEANS FOR INDICATING OPTIMUM DISCHARGE CONDITIONS", granted Oct. 27, 1970 to L. P. Dorbec et al. This patent discloses a gas laser, of the type indicated above, which is pumped by an RF transverse electric field. An improvement on this type of laser is disclosed in U.S. Pat. No. 4,373,202, "RF EXCITED WAVEGUIDE GAS LASER" granted Feb. 8, 1983 to Katherine D. Laakmann et al. This patent employs a more efficient longitudinal electric field generating electrode structure of interdigitated fingers attached to the optical waveguide wall.

SUMMARY OF THE INVENTION

The invention involves an improved arrangement of the exciting electrodes of an RF pumped waveguide polyatomic gas laser. The electrodes provide a continuous transmission line structure for the RF energy with longitudinal electric fields to provide a more efficient modality to the pumping fields within the laser.

DESCRIPTION OF THE PREFERRED EMBODIMENT

Figure 1:
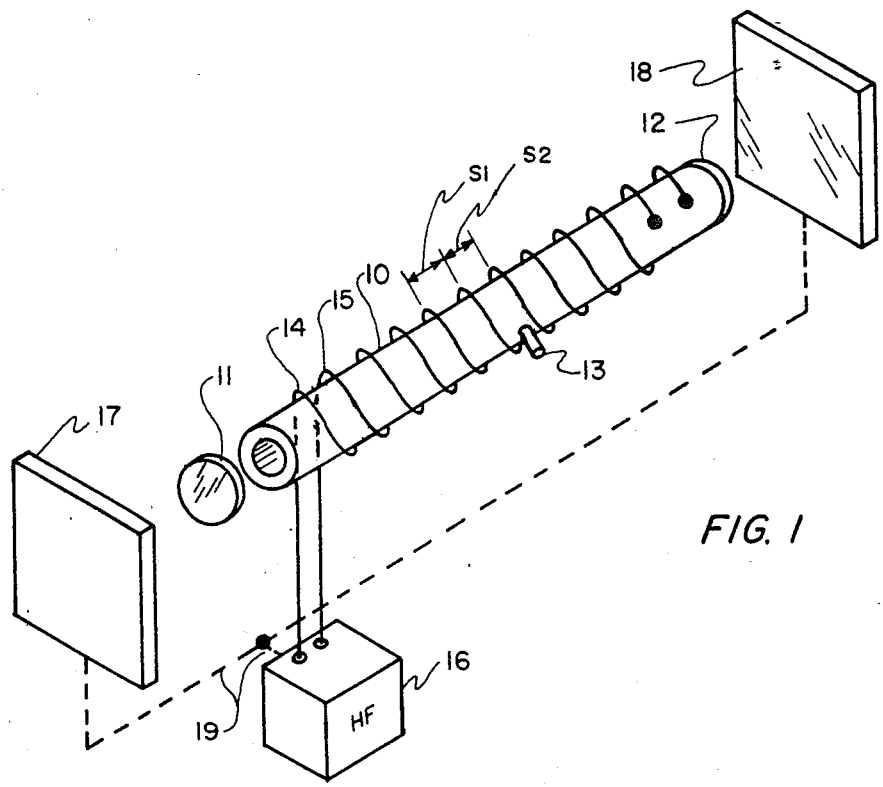
FIG. 1 shows the essential elements of a polyatomic gas laser including the spiral conductive elements of the present invention.

The essential elements of the gas laser according to the present invention are shown in FIG. 1. The principle element is a tube 10 of dielectric material such as glass, a ceramic, a plastic or any like substance which can withstand the elevated temperature (150° C.) and reduced pressure (100 millibars) which result from ionizing a polyatomic gas therein. The material must have a low dielectric loss factor at high frequencies, e.g. less than $10^{-3}$, to increase the efficiency of the pumping action. The basic cross section may be round, but this can be varied to control optical moding for various applications which require polarization control. The tube acts as a weak dielectric waveguide, which in its round form with longitudinal E-field pumping induces an $EH_{11}$ mode.

The ends of the tube are sealed with two windows 11 and 12 made from a material that is transparent to far-infrared radiation, such as germanium, zinc selenide or various formulations sold under the Trade Name of "IRTRAN". Before closing the tube it is filled with a suitable gas mixture. This can be done through a small filler tube 13. The windows can be sealed with glass frit, epoxy glue, or other hard sealing technique. The filler tube 13 is closed simultaneously heating and compressing it until opposite walls fuse together.

The pumping electrodes consist of a pair of spiral conductors 14 and 15 connected at their input end to radio frequency EMR generator 16 and wrapped around the tube at a small angle so that the normal between the conductors is nearly parallel to the axis of the optical waveguide. The deviation from parallel is due to the pitch of the helix and this in turn is determined by the spacing of the conductors. It is important in the present invention that the spacing (s1) between the leads or conductors be significantly less than the diameter of the ceramic tube to obtain only longitudinal ionization current paths in the low pressure gas therein. Since the reduced spacing decreases the ionization potential between the conductors, on the tube exterior it is preferred to not exceed a diameter/spacing ratio of 3. The ionization potential can also be controlled, as is well known in the art, by properly shaping the conductor cross-section and/or embedding them in a dielectric that resists electrical breakdown. If the spacing (S2) between adjacent turns of the transmission line is equal to (S1) there will be a substantially equal and opposite breakdown current across this spacing. This resembles the effect achieved in the Laakmann patent cited above. If desired, the proportions of discharge current between S1 and S2 can be controlled by the shape and spacing of the conductors from equal values to the complete elimination of either. One of these spacings, however, must remain significantly less than the tube diameter.

The tube is placed between two mirrors 17 and 18 which form a Fabry-Perot Cavity. A mounting means or housing 19 normally interconnects the waveguide, mirrors and radio frequency generator 16 to provide a portable unit. The radio frequency generator can be battery powered or include suitable rectifiers and voltage regulators to operate from available power supply mains. The mirrors can be placed in the waveguide to avoid multiple transmission losses in the windows or outside to permit the insertion of intra cavity optics, whichever is the most critical.

Figure 2:
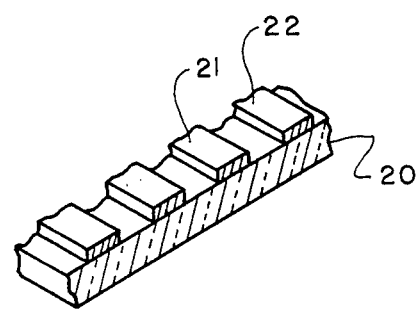
FIG. 2 shows a simple embodiment of the conductors which involves no modification of the optical waveguide.

There are a number of ways of forming the spiral conductors. They can be simply the usual round cross-section wires cemented to the waveguide or they can be ribbon-like wires 21 and 22 as shown in FIG. 2 which are more firmly attached. The latter may also be formed using photographic techniques as in the manufacture of printed circuits.

Figure 3:
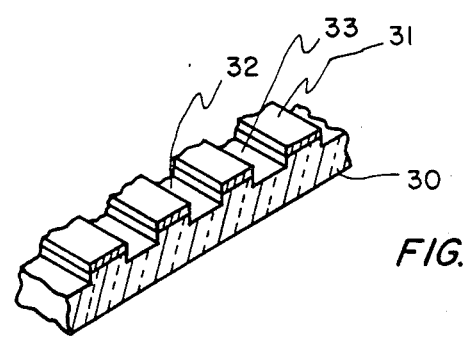
FIG. 3 shows an embodiment with conductor structure similar to FIG. 2, wherein the conductor processing results in a slightly modified waveguide.

FIG. 3 shows an alternate conductor structure formed by plating a metal layer 31 on the entire outer surface of the waveguide and their cutting two spiral grooves 32 and 33 of the same pitch on a lathe, the grooves having widths of S1 and S2 as defined above. The grooves extend into the waveguide only deep enough to insure complete removal of all metal from the groove and do materially effect the mechanical or electrical properties of the waveguide. To insure this fact the thickness of the waveguide may be slightly increased, e.g. 2 mils over a normal thickness of 20 mils.

Figure 4:
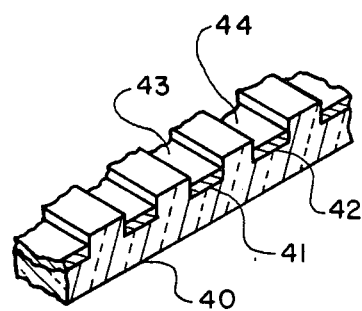
FIG. 4 shows an embodiment wherein the waveguide is slightly modified to improve the mechanical and electrical characteristics of the conductors.

FIG. 4 shows another approach in which the waveguide is provided with two spiral grooves 41 and 42 with alternate center spacings of S1 and S2 which can be cut, molded or otherwise formed at the most convenient stage of its manufacture. The conductors 43 and 44 are then deposited or cemented into these grooves. The entire surface of the waveguide may first be plated with conductor and the metal on the elevated surface between the grooves can then be easily removed by cutting or abrasion.

Figure 5:
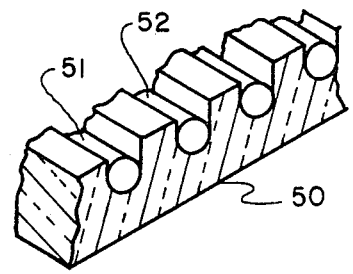
FIG. 5 shows an embodiment using simple round wire conductors.

FIG. 5 shows a similar construction to that in FIG. 4 but using a round wire conductor. Round wire conductors 51 and 52 provide wider edge spacing for a given center spacing and a contour that resists electrical breakdown. The thin flat conductors shown in FIGS. 2-4, however, tend to be more efficient current conductors due to the absence of skin effects.

Figure 6:
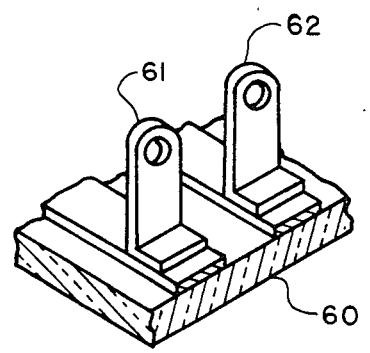

FIG. 6 shows the input end of the pumping conductors to which are soldered a pair of terminals 61 and 62. These terminals may be simple solder type or adapted to receive a coupling socket that leads from the high frequency generator.

Regardless of the fabrication technique employed, the waveguide may receive a final coating of dielectric material to cement the conductors in place, eliminate voltage breakdown paths, prevent corrosion of metal parts and/or provide a tough smooth outer surface to prevent chipping and facilitate installation in mounting structures.

We claim:

1. A gas filled laser tube for use in a Fabry-Perot cavity to generate electromagnetic radiation (EMR) within a given band of submillimeter wavelengths, comprising:
    an elongated tube of dielectric material characterized by low loss propogation of radio frequency EMR;
    a pair of end caps hermetically sealing the ends of said tube, said caps being transparent to said given band of EMR; and
    a transmission line formed by twin parallel wires for high frequency EMR spiralled around the exterior surface of said tube such that the maximum intensity electric field line between said wires which penetrates said tube is parallel to the tube axis.

2. A tube in accordance with claim 1, wherein:
    said tube includes spiral grooves in which said twin parallel wires are embedded.

3. A tube in accordance with claim 2, wherein:
    said wires are bonded to said tube.

4. A tube as set forth in claim 2, wherein said wires are potted in a dielectric coating such that the electric breakdown potential between said wires over the outside of said tube is greatly increased.

5. A tube in accordance with claim 1, wherein:
    said wires are bonded to said tube.

6. A tube in accordance with claim 1, wherein:
    said wires are ribbon shaped.

7. A tube as set forth in claim 1, wherein:
    said wires have a round cross-section.

8. A tube as set forth in claim 1, wherein said wires are potted in a dielectric coating such that the electric breakdown potential between said wires over the outside of said tube is greatly increased.

* * * * *